US006969221B2

(12) United States Patent
Schultz

(10) Patent No.: US 6,969,221 B2
(45) **Date of Patent: *Nov. 29, 2005**

(54) THREADED INSERT FOR FASTENERS

(75) Inventor: Dennis Schultz, San Juan Capistrano, CA (US)

(73) Assignee: Hi-Shear Corporation, Torrance, CA (US)

(*) Notice: Subject to any disclaimer, the term of this patent is extended or adjusted under 35 U.S.C. 154(b) by 188 days.

This patent is subject to a terminal disclaimer.

(21) Appl. No.: 10/716,569

(22) Filed: Nov. 18, 2003

(65) Prior Publication Data

US 2004/0071523 A1 Apr. 15, 2004

Related U.S. Application Data

(63) Continuation of application No. 10/153,167, filed on May 22, 2002, now Pat. No. 6,672,811.

(51) Int. Cl.[7] ........................... F16B 37/12; F16B 39/28

(52) U.S. Cl. ........................ 411/110; 411/178; 411/292; 411/939

(58) Field of Search ................................. 411/110, 178, 411/292, 321–322, 939

(56) References Cited

U.S. PATENT DOCUMENTS

| | | | | |
|---|---|---|---|---|
| 2,855,970 A | | 10/1958 | Neuschotz | |
| 3,371,697 A | | 3/1968 | James | |
| 3,472,302 A | * | 10/1969 | Rosan, Jr. et al. | 411/110 |
| 3,513,896 A | * | 5/1970 | Neuschotz | 411/110 |
| 3,650,309 A | * | 3/1972 | Neuschotz | 411/110 |
| 3,667,526 A | * | 6/1972 | Neuschotz | 411/110 |
| 4,767,249 A | * | 8/1988 | Elcock et al. | 411/110 |

OTHER PUBLICATIONS

PCT–International Search Report.

* cited by examiner

*Primary Examiner*—Daniel P. Stodola
*Assistant Examiner*—Christopher J. Boswell
(74) *Attorney, Agent, or Firm*—Fulwider Patton Lee Lee & Utecht, LLP

(57) ABSTRACT

A threaded insert for providing stronger threads to a parent material. The threaded insert includes a bushing portion having male threads on the external surface and female threads within an internal bore. The threaded insert also includes keys which lock the threaded insert into a threaded hole within the parent material. The keys are positioned within slots along the external surface of the bushing portion of the threaded insert. The slots include two substantially parallel walls which are substantially perpendicular to a bottom surface of the slots. A method for assembling the threaded insert reduces the tendency of the keys to be installed offset from the bottom surface of the slots.

15 Claims, 5 Drawing Sheets

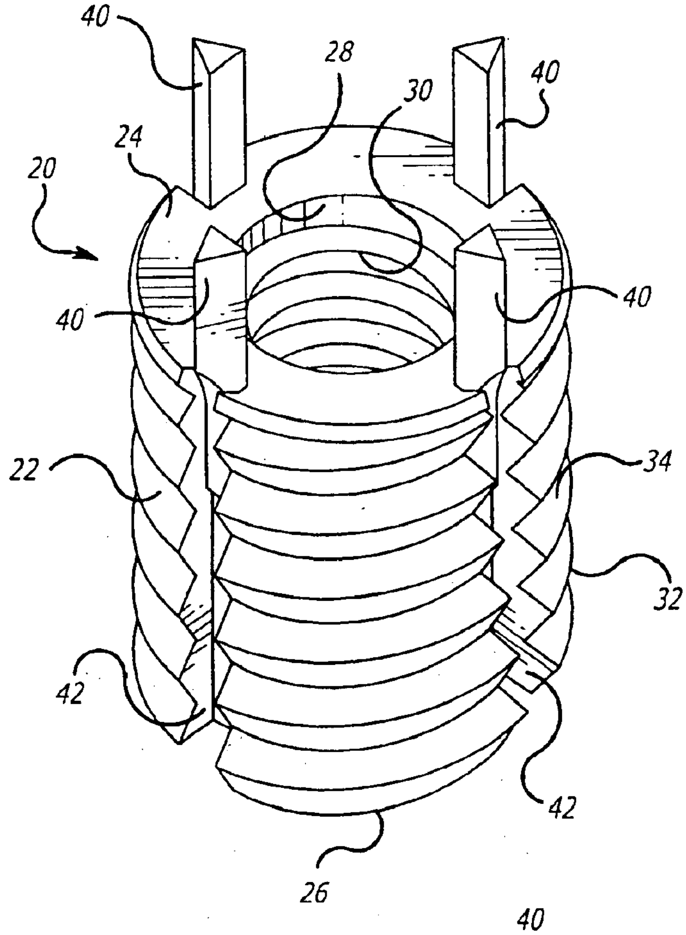
FIG. 2
FIG. 3b
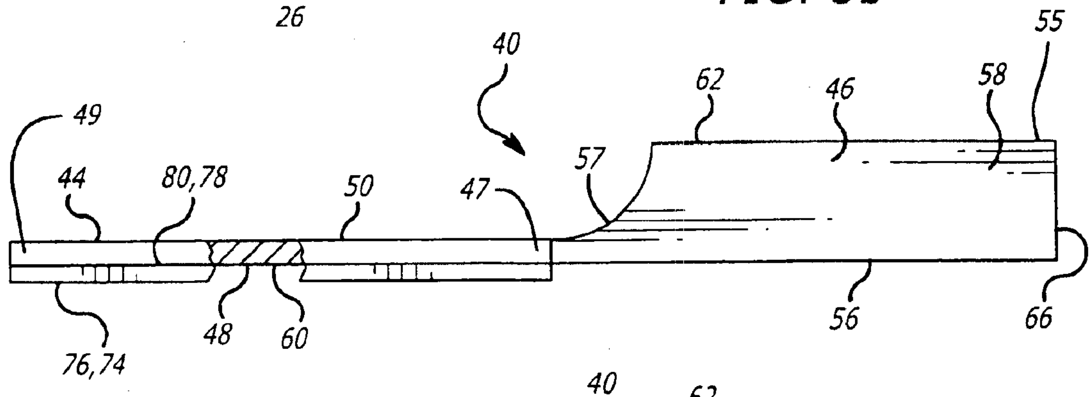
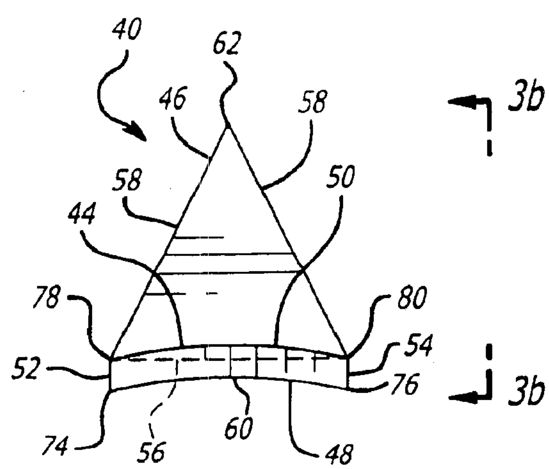
FIG. 3a

THREADED INSERT FOR FASTENERS

RELATED APPLICATIONS

This is a continuation of Ser. No. 10/153,167, filed May 22, 2002, now U.S. Pat. No. 6,672,811.

BACKGROUND OF THE INVENTION

1. Field of the Invention

This invention relates generally to threaded inserts, and more particularly to a threaded insert having keys which are positioned within 90° straight wall slots.

2. Description of the Related Art

Threaded inserts of the type to which this invention is directed are ordinarily used to provide strong, permanent threads in soft or ductile parent materials, especially when a mating stud or bolt is to be frequently removed. Threaded inserts are also used to repair stripped, damaged or worn threads in a parent material. Soft or ductile materials which have received threaded inserts typically exhibit improved load-carrying capacity under static and dynamic loading conditions.

Referring to FIGS. 1*a*, 1*b* and 1*c*, a prior art threaded insert includes a bushing portion having a cylindrical shape with a central bore throughout the length of the threaded insert. The bushing portion also includes female threads throughout the length of the surface within the central bore and male threads throughout the length of the external surface of the bushing portion. The male threads on the external surface of the bushing portion are configured to mate with a threaded hole within a parent material, such as a plate or casting made of aluminum or magnesium. The female threads within the central bore are configured to mate with a male threaded fastener, such as a bolt or stud. The threaded insert is typically made from a material which is stronger than the parent material, such as steel.

To ensure that the prior art threaded insert does not rotate within the threaded hole in the parent material when a male threaded fastener is being installed or removed, the threaded insert includes at least one key. The at least one key is ordinarily positioned within a dovetail slot which extends longitudinally along the external The dovetail slot is added to the threaded insert through a broaching operation. The broaching operation includes forcing an elongated, serrated cutting tool having sequentially larger teeth in the form of the dovetail slot along the external surface of the threaded insert. During manufacturing of the threaded fastener, the broaching step generally requires an additional machine set-up, which can lead to increased manufacturing costs. Also, broaching tools are often relatively expensive compared to other types of tools, thus adding further to the manufacturing costs of the threaded insert.

After the broaching operation, the dovetail slot is deburred to remove any protruding ragged edges that may have been raised on the male threads on the external surface of the threaded insert during the broaching operation. The deburring operation is often performed by hand, which can add to the time and cost required to fabricate the threaded insert.

The key includes a tang portion and a locking portion with the tang portion and the locking portion being positioned adjacent each other and aligned longitudinally. A cross section of the tang portion includes a substantially rectangular shape, while a cross section of the locking portion includes a substantially triangular shape. The tang portion is positioned within the dovetail slot through an interference fit. An inside surface on the tang portion is preferably in contact with the bottom surface of the dovetail slot and the outside facing edges of the tang portion are broached into the angled surfaces of the dovetail slot. The thickness of the tang portion is sufficiently low that with the tang portion being in contact with the bottom surface of the dovetail slot, the outer corners of the tang portion remain deeper than the inside diameter of the male threads on the external surface of the threaded insert. This prevents the tang portion from interfering with the threads within the hole in the parent material during installation of the threaded insert. Prior to installation of the threaded insert into the parent material, the locking portion is positioned beyond the end of the bushing portion of the threaded insert. The thickness of the locking portion is sufficient that the outermost portion of the locking portion is positioned substantially flush with the outside diameter of the male threads on the external surface of the threaded insert.

During installation of the key into the dovetail slot, the inside surface of the tang portion of the key is substantially aligned with the bottom surface of the dovetail slot at an end of the threaded insert. A longitudinal force is applied to the key so that the tang portion of the key is pushed into the dovetail slot with the outside edges of the tang portion being broached into the angled surfaces of the dovetail slot. With no positive forces pushing the tang portion against the bottom surface of the dovetail slot during installation of the key into the dovetail slot, the inside surface of the tang portion may inadvertently be installed offset from the bottom surface of the dovetail slot. Therefore, a key resetting operation is performed to ensure that the tang portion is not positioned within the male threads on the external surface of the threaded insert. The key resetting operation includes applying a force to the tang portion of the key in a direction substantially perpendicular to the bottom surface of the dovetail slot. For those keys which are located with the tang portion offset from the bottom surface of the dovetail slot, the key resetting operation may cause the key to be pushed out of the newly broached portion of the angled surfaces of the slot and to become loose, which may be a sufficient reason to scrap the threaded insert. Also, the key resetting operation is a process which increases the manufacturing cost of the threaded insert.

At installation, the threaded insert may be screwed into the threaded hole in the parent material until the locking portion of the at least one key on the threaded insert contacts a surface of the parent material. The at least one key is then driven into the parent material so that the locking portion of the key broaches through the threads of the threaded hole in the parent material and remains in place within the threads in the parent material. Having the key in place within the threads in the parent material locks the threaded insert in place by preventing further rotation of the threaded insert within the threaded hole in the parent material. While driving the at least one key into the parent material, the tang portion of the key is simultaneously broached further into the angled surfaces of the dovetail slot, thereby adding to the difficulty of driving the key into the parent material.

In light of the foregoing description, those skilled in the art have recognized the need for a threaded insert having at least one locking key but having less tendency to broach into the slot within the threaded insert. The need for a threaded insert which can be manufactured more economically and with improved retention and alignment of the keys has also been recognized. Further, the need for a threaded insert which is configured for improved key driving has been recognized. The present invention fulfils these needs and others.

SUMMARY OF THE INVENTION

Briefly, and in general terms, the present invention is directed to a threaded insert having keys which are positioned within slots having substantially parallel walls that are substantially perpendicular to the bottom surface of the slot.

In a currently preferred embodiment of the invention, the threaded insert includes at least one key. While those skilled in the art will recognize that more than one key and slot may be provided within the scope of the invention, reference will be made to an embodiment wherein only one key, slot and related surfaces are described. The key includes a substantially longitudinal tang portion having a first end, a second end, a first face, a second face, a first side surface and a second side surface. The first face and the second face are substantially parallel and have a curved profile, the first face having a concave surface and the second face having a convex surface. The first and second side surfaces are adjacent to the first face and the second face.

The key also includes a substantially longitudinal locking portion having a first end, a second end and a substantially triangular cross section which forms a back face and two angled faces. The second end of the locking portion is positioned adjacent the first end of the tang portion such that the tang portion and the locking portion are substantially longitudinally aligned. The back face is substantially longitudinally aligned with an apex of the first surface of the tang portion, while the intersection of the two angled faces project beyond an apex of the second surface of the tang portion.

In another currently preferred aspect of the invention, the threaded insert also includes a bushing portion. The bushing portion includes a substantially cylindrical shape with a first end, a second end and a central bore therethrough. A surface of the central bore includes female threads throughout the length of the bushing portion, while an external surface of the bushing portion includes male threads throughout the length of the bushing portion. The bushing portion also includes at least one slot which is positioned on the external surface and extends substantially longitudinally throughout the length of the bushing portion. The slot includes a bottom surface and two wall surfaces. The two wall surfaces are substantially parallel to each other and substantially perpendicular to the bottom surface with the depth of the slot being greater than the depth of the male threads on the external surface.

In a further currently preferred aspect of the invention, the tang portion of the key is positioned within the slot toward the first end of the bushing portion. The edges between the first face and the first and second side surfaces of the tang portion are positioned in contact with the bottom surface of the slot in the bushing portion. The edges between the second face and the first and second side surfaces of the tang portion have an interference fit with the two walls within the slot of the bushing portion. The locking portion of the key extends beyond the first end of the bushing portion. The depth of the slot of the bushing portion is sufficient that the apex of the second surface of the tang portion of the prior art key is positioned at a depth which is deeper than the inside diameter of the male threads on the external surface of the bushing portion. The depth of the slot of the bushing portion also places the intersection of the two angled faces of the locking portion of the corresponding key at a depth which is shallower than the inside diameter of the male threads on the external surface of the bushing portion.

In a currently preferred detailed aspect of the invention, the male threads on the external surface of the bushing portion are configured to mate with a threaded hole in a parent material, while the female threads within the central bore are configured to mate with a male threaded fastener. In another currently preferred aspect of the invention, the key includes four keys which are positioned approximately ninety degrees apart from each other about the circumference of the bushing portion. The first and second side surfaces of the tang portion of the key are substantially perpendicular to tangents along the first face of the tang portion at the intersection of the first face and the first and second sides respectively. The angled faces of the locking portion of the key taper into the second face of the tang portion of the key. In one currently preferred aspect of the invention, the taper includes an angled taper, while in another currently preferred aspect of the invention the taper includes a curved taper. In a further currently preferred aspect of the invention, the intersection of the angled faces of the locking portion of the key may be positioned either above flush, below flush or substantially flush with the outside diameter of the male threads on the external surface of the bushing portion. The locking portion of the key further includes an end surface at the first end of the locking portion. The end surface is substantially perpendicular to the back face and the two angled faces of the locking portion. In an additional currently preferred aspect of the invention, the entire locking portion of the key extends beyond the first end of the bushing portion. In another currently preferred aspect of the invention, the first side surface and the second side surface of the tang portion of the key have an interference fit with the two walls within the slot of the bushing portion.

The invention also includes a currently preferred method of assembling the threaded insert. The method includes providing the key and the bushing portion. The method also includes positioning the tang portion of the key within the slot toward the first end of the bushing portion such that the edges between the first face of the tang portion and the first and second side surfaces of the tang portion are in contact with the bottom surface of the slot in the bushing portion. The tang portion is also positioned such that the locking portion of the key extends beyond the first end of the bushing portion. The method further includes applying a force to the second face of the tang portion of the key in a direction substantially perpendicular to the bottom surface of the slot. The force is applied until the curved profile of the tang portion of the key is reduced and an apex of the second face of the tang portion is positioned at a depth which is deeper than the inside diameter of the external threads of the bushing portion. The force is also applied until an interference fit is formed between the tang portion of the key and the slot of the bushing portion.

In a detailed aspect of the currently preferred method of assembling the threaded insert, applying a force to the second face of the tang portion includes applying the force until the interference fit is formed between the walls of the slot of the bushing portion and the edges between the second face and the first and second sides of the tang portion of the key. In another currently preferred detailed aspect of the invention, applying a force to the second face of the tang portion includes applying the force until the interference fit is formed between the walls of the slot of the bushing portion and the first and second side surfaces of the tang portion of the key.

From the above, it may be seen that the invention provides for a threaded insert having at least one key which is positioned within a slot having parallel walls that are perpendicular to the bottom surface of the slot. It may also be seen that the key has less tendency to broach into the slot within the bushing portion and that the threaded insert is configured for improved key driving compared to prior art threaded inserts. Additionally, it may be seen that the threaded insert of the invention can be manufactured more economically and with improved retention and alignment of the key compared to prior art threaded inserts. These and other aspects and advantages of the invention will become apparent from the following detailed description and the accompanying drawings, which illustrate by way of example the features of the invention.

BRIEF DESCRIPTION OF THE DRAWINGS

FIG. 2 is a perspective view depicting a threaded insert of the present invention.

FIG. 3*a* is an elevation view depicting a key of the threaded insert of FIG. 2.

FIG. 3*b* is an elevation view depicting the key of FIG. 3*a* taken from line 3*b*—3*b* in FIG. 3*a*.

DETAILED DESCRIPTION OF THE PREFERRED EMBODIMENTS

Figure 1A:
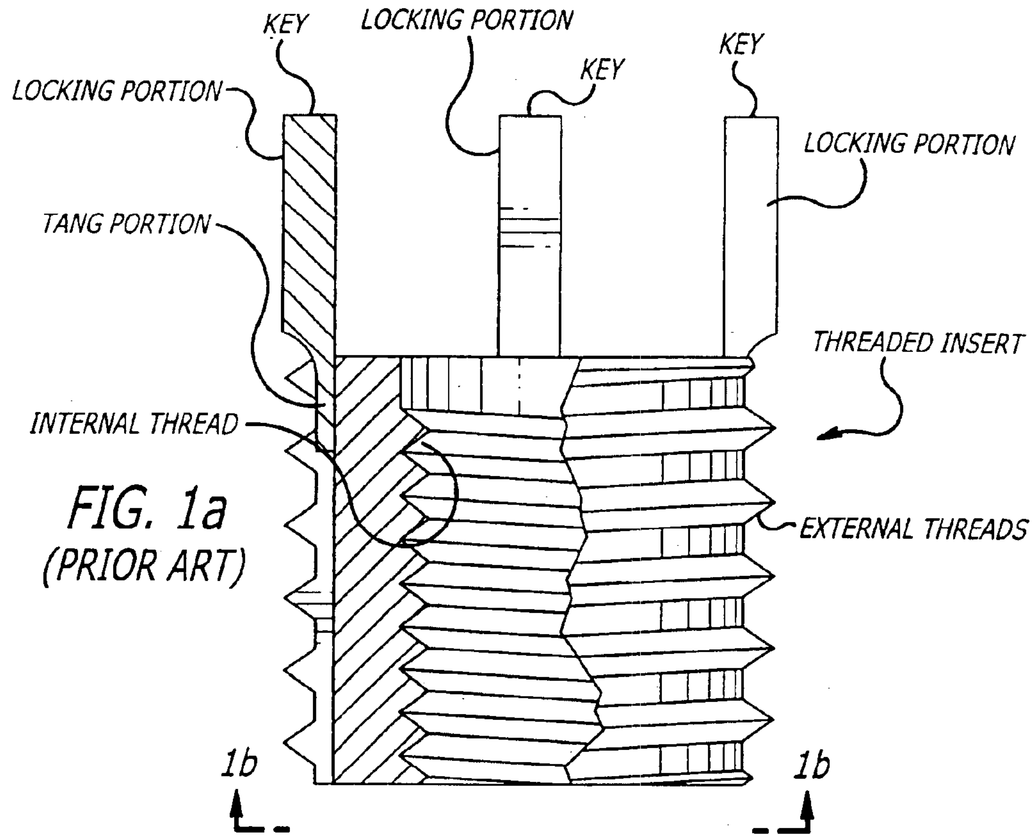
FIG. 1*a* is an elevation view, partly in cross section, depicting a prior art threaded insert.
Figure 1B:
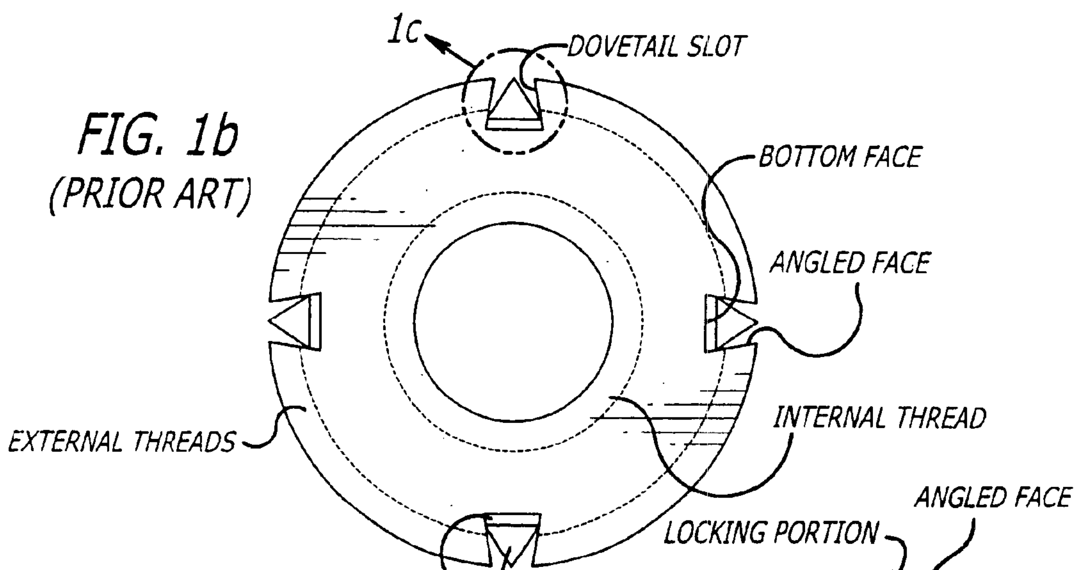
FIG. 1*b* is a plan view of the prior art threaded insert of FIG. 1*a* taken from line 1*b*—1*b* in FIG. 1*a*.
Figure 1C:
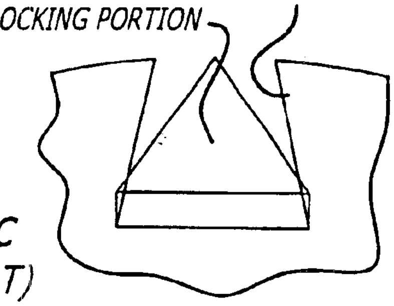
FIG. 1*c* is a section view depicting a portion of the prior art threaded insert of FIG. 1*a* taken from line 1*c* in FIG. 1*b*.

As shown in the drawings, which are provided for purposes of illustration, but not by the way of limitation, the invention is embodied in a threaded insert which is used to provide strong, permanent threads in a relatively soft or ductile parent material. Referring to the drawings in which like reference numerals are used to designate like or corresponding elements among the figures, FIG. 2 depicts a threaded insert 20 of the present invention. The threaded insert 20 includes a bushing portion 22 having a substantially cylindrical shape with a first end 24, a second end 26 and a central bore 28 therethrough. A surface of the central bore 28 includes female threads 30 throughout the length of the bushing portion 22, while an external surface 32 of the bushing portion includes male threads 34 throughout the length of the bushing portion. The male threads 34 may be configured to mate with a threaded hole 36 (FIGS. 5*a* and 5*b*) in a parent material 38, such as a plate or casting, while the female threads 30 may be configured to mate with a male threaded fastener, such as a bolt or a stud (not shown). The threaded insert 20 also includes at least one key 40 for ensuring that the threaded insert does not rotate within the threaded hole in the parent material after installation into the parent material. Each of the keys 40 is positioned within a slot 42 which extends substantially longitudinally along the external surface 32 of the bushing portion 22. In one currently preferred embodiment, the threaded insert 20 includes four keys 40 which are positioned within four respective slots arranged approximately ninety degrees apart from each other about the circumference of the bushing portion 22.

Referring to FIGS. 3*a* and 3*b*, the key 40 includes a tang portion 44 and a locking portion 46 which may be formed from a single piece of material which is stronger than the parent material. The tang portion 44 may include a substantially longitudinal structure having a first end 47, a second end 49, a first face 48 and a second face 50. The first face 48 and the second face 50 of the tang portion 44 may be substantially parallel and include a curved profile with the first face forming an inside, concave curved surface and the second face forming an outside, convex curved surface. The tang portion 44 may also include a first side surface 52 and a second side surface 54. The first side surface 52 may be substantially perpendicular to the tangent along the first face 48 at the intersection of the first face and the first side surface. Similarly, the second side surface 54 may be substantially perpendicular to the tangent along the first face 48 at the intersection of the first face and the second side surface. The curved shape of the tang portion 44 may be created through manufacturing processes which are well known in the art, such as stamping.

The locking portion 46 of the key 40 may include a substantially longitudinal structure which is positioned adjacent to the tang portion 44. The locking portion 46 may include a first end 55, a second end 57 and a substantially triangular cross section. The triangular cross section may include a back face 56 and two angled faces 58. The second end 57 of the locking portion 46 may be positioned adjacent to the first end 47 of the tang portion 44 such that the tang portion and the locking portion are substantially longitudinally aligned. The back face 56 of the locking portion 46 may be substantially longitudinally aligned with an apex 60 of the first face 48 of the tang portion 44. The two angled faces 58 of the locking portion 46 may taper into the second face 50 of the tang portion 44 of the key 40, such as through an angled taper or a curved taper. The distance between the back face 56 and the intersection 62 between the two angled faces 58 is sufficient such that after installation of the key 40 into the slot 42 in the bushing portion 22 (FIGS. 4*a*, 4*b* and 4*c*), the intersection of the angled faces is positioned at a depth which is shallower than the inside diameter 72 of the male threads 34 on the external surface 32 of the bushing portion. In one currently preferred embodiment, the intersection 62 of the two angled faces 58 of the locking portion 46 may be positioned substantially flush with the outside diameter 64 of the male threads 34 on the external surface 32 of the bushing portion 22. In other currently preferred embodiments, the intersection 62 of the two angled faces 58 of the locking portion 46 may be positioned either above flush or below flush with the outside diameter 64 of the male threads 34 on the external surface 32 of the bushing portion 22. An end surface 66 at the first end 55 of the locking portion 46 may be substantially perpendicular to the back face 56 and the two angled faces 58.

Figure 4A:
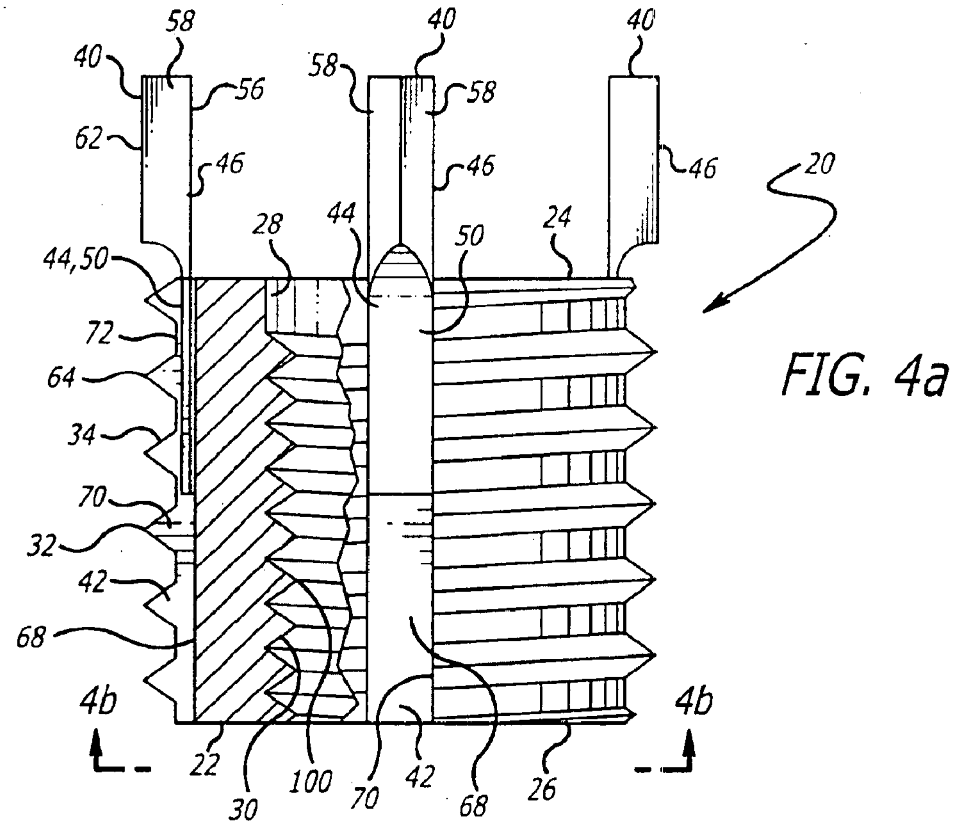
FIG. 4*a* is an elevation view, partly in cross section, depicting the threaded insert of FIG. 2.
Figure 4B:
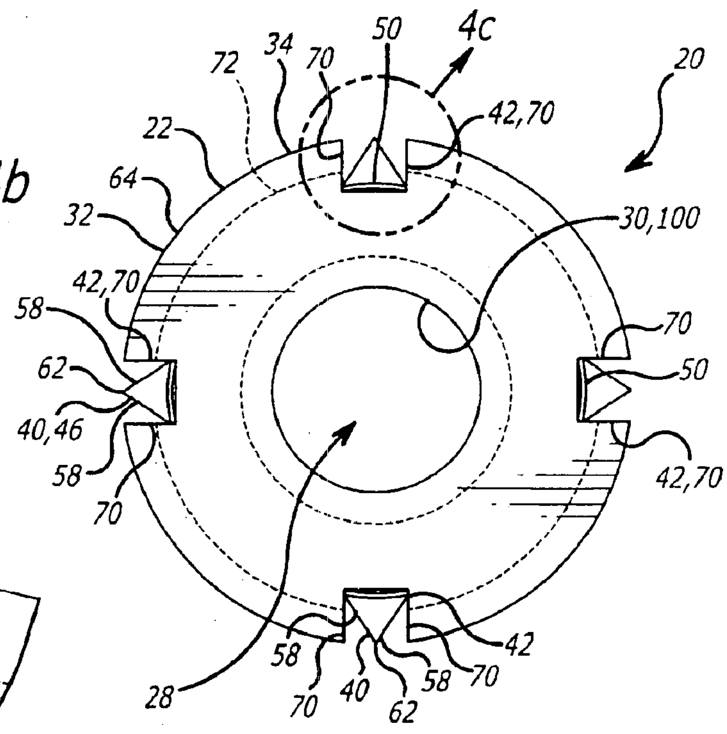
FIG. 4*b* is a plan view of the threaded insert of FIG. 2 taken from line 4*b*—4*b* in FIG. 4*a*.
Figure 4C:
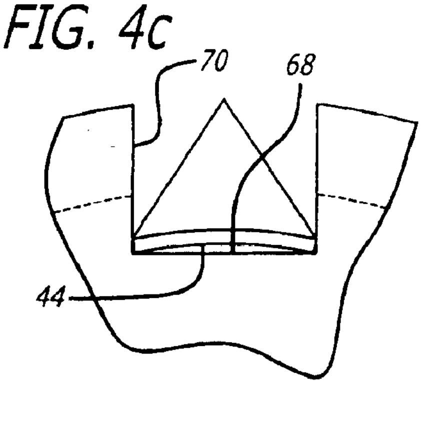
FIG. 4*c* is a section view depicting a portion of the threaded insert of FIG. 4*a* taken from line 4*c* in FIG. 4*b*.

Referring to FIGS. 4*a*, 4*b* and 4*c*, each of the slots 42 in the bushing portion 22 of the threaded insert 20 includes a bottom surface 68 and two walls 70 which are substantially perpendicular to the bottom surface. The width of each slot 42 is sufficient to accommodate the tang portion 44 and the locking portion 46 of a key 40. The depth of each slot 42 is greater than the depth of the male threads 34 on the external surface 32 of the bushing portion 22 and is sufficiently deep that with the key 40 installed in the bushing portion, the tang portion 44 of the key remains at a depth which is deeper than the inside diameter 72 of the male threads of the bushing portion.

The bushing portion 22 of the threaded insert 20 may be fabricated through manufacturing techniques which are well known in the art. For example, the bushing portion 22 may be manufactured from round bar stock on a computer numerical control (CNC) machine (not shown). A CNC machine may machine the female threads 30 within the central bore 28 and the male threads 34 on the external surface 32 in a single machine setup. With the same machine setup, the slots 42 may be machined. With the slots 42 including the two walls 70 which are perpendicular to the bottom surface 68 of the slots, the slots may be produced through the use of a simple tool, such as a circular saw or a milling cutter. The cost for a machine tool such as a circular saw blade or a milling cutter is considerably less than the cost for a broaching tool such as those used to produce the slots of prior art configurations.

Producing the slots 42 with a circular saw creates fewer burrs on the male threads 34 than the broaching method used to produce the slots of prior art configurations, thereby reducing the time and cost required for deburring. Also, the deburring step may be automated and performed by the CNC machine with the same machine setup as for machining the female threads 30, male threads 34 and slots 42, thereby further reducing the time and cost required to fabricate the bushing portion 22. After machining the female threads 30, male threads 34 and slots 42, and deburring the slots on the CNC machine, the bushing portion 22 of the threaded insert 20 may be cut off from the round bar stock to a finished length.

In assembling the threaded insert 20, the tang portion 44 of each of the keys 40 may be inserted into a corresponding slot 42 toward the first end 24 of the bushing portion 22 such that the edge 74 (FIGS. 3*a* and 3*b*) of the tang portion between the first face 48 and the first side surface 52 and the edge 76 (FIGS. 3*a* and 3*b*) between the first face and the second side surface 54 are in contact with the bottom surface 68 of the slot. The locking portion 46 of each of the keys 40 may extend beyond the first end 24 of the bushing portion 22 during the assembly process. In one currently preferred embodiment, the entire locking portion 46 of each of the keys 40 extends beyond the first end 24 of the bushing portion 22.

To retain the keys 40 within their respective slots 42, a force may be applied to the second face 50 of the tang portion 44 of each key in a direction substantially perpendicular to the bottom surface 68 of the corresponding slot in order to reduce the curved profile of the tang portion. Reducing the curved profile of the tang portion 44 causes the first 52 and second 54 side surfaces (FIGS. 3*a* and 3*b*) of the tang portion to spread apart, resulting in the edges 78, 80 of the tang portion 44 between the second face 50 and the first 52 and second 54 side surfaces contacting the two walls 70 of the slot 42 and creating an interference fit between the tang portion and the slot. Alternatively, the first 52 and second 54 side surfaces of the tang portion 44 may contact the two walls 70 of the slot 42 and create an interference between the tang portion and the slot.

The assembly process facilitates positioning of the tang portion 44 of the keys 40 in contact with the bottom surface 68 of the slot 42. With the edges 74, 76 between the first face 48 and the first 52 and second 54 side surfaces of the tang portion 44 positioned in contact with the bottom surface 68 of the slot 42, there is less need for a key resetting process as performed on threaded inserts of prior art configurations. By reducing the need of the key resetting process from the assembly of the threaded insert 20, the production cost of the threaded insert is reduced. Also, positioning the edges 74, 76 between the first face 48 and the first 52 and second 54 side surfaces of the tang portion 44 of the keys in contact with the bottom surface 68 of the slots 42 improves the alignment of the keys 40 with the slots and increases the retention of the keys within the slots, thereby reducing the amount of scrap created during the assembly of the threaded inserts 20 compared to prior art threaded insert configurations.

Figures 5A, 5B:
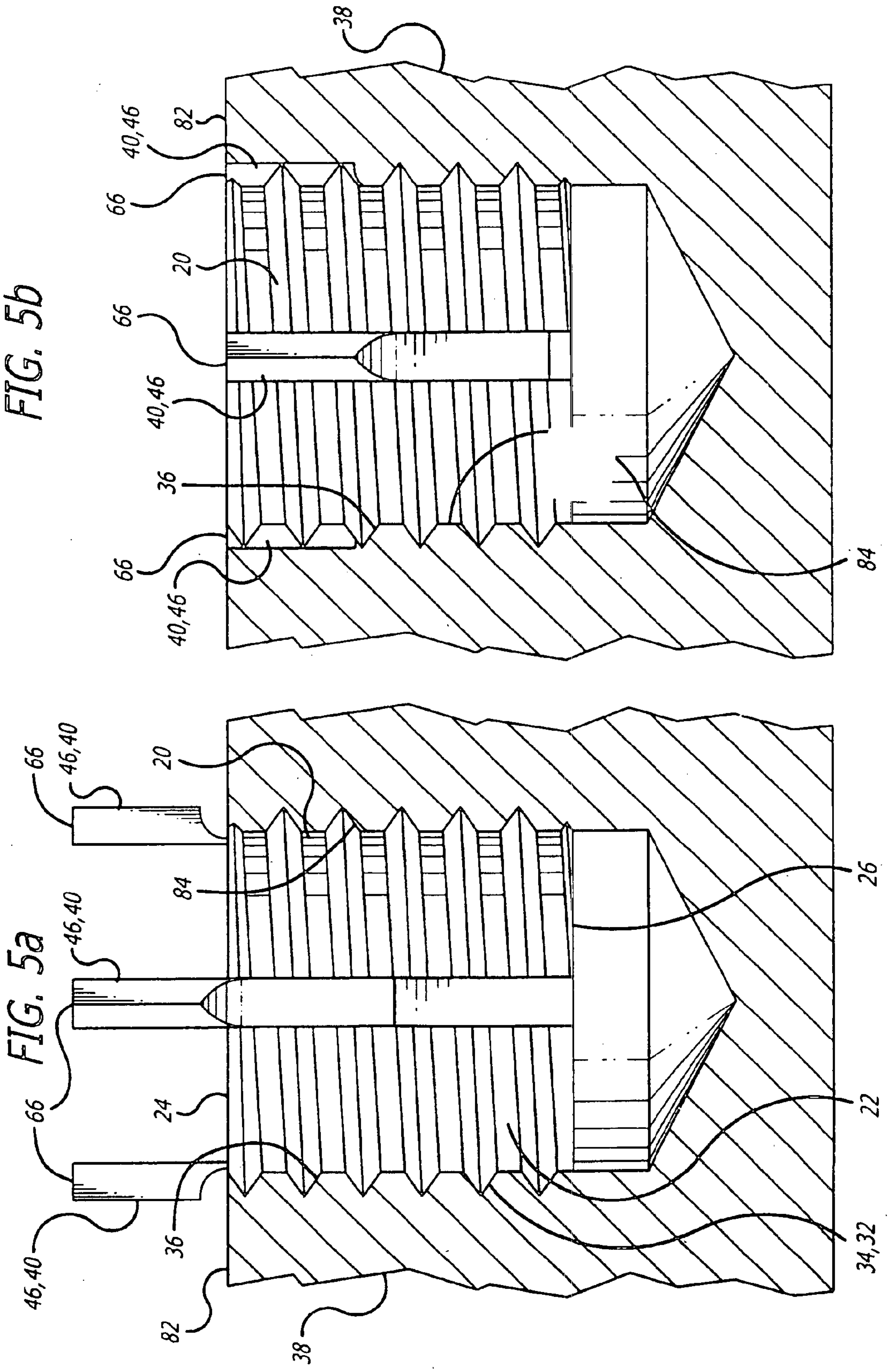
FIG. 5*a* is a section view depicting a portion of the installation of the threaded insert of FIG. 2.
FIG. 5*b* is a section view depicting a portion of the installation of the threaded insert of FIG. 2.

Referring to FIG. 5*a*, installation of the threaded insert 20 into the parent material 38 includes aligning the second end 26 of the bushing portion 22 of the threaded insert with the threaded hole 36 in the parent material and screwing the threaded insert into the threaded hole within the parent material. In one currently preferred embodiment, the threaded insert 20 is screwed into the parent material 38 until the first end 24 of the bushing portion 22 is approximately 0.25–0.76 mm (0.01–0.03 inches) below the surface 82 of the parent material. The depth to which the threaded insert 20 is screwed into the threaded hole 36 in the parent material 38 may be controlled by the longitudinal placement of the locking portion 46 of the keys 40 during assembly of the threaded insert. Since the locking portion 46 of the keys 40 extends into the male threads 34 on the external surface 32 of the bushing portion 22 of the threaded insert 20, the threaded insert can only be screwed into the threaded hole 36 within the parent material 38 until the locking portion of the keys contacts the parent material. In this manner, the locking portion 46 of the keys 40 may act as a depth-control stop for the threaded insert 20.

As shown in FIG. 5*b*, with the threaded insert 20 positioned at a desired depth within the threaded hole 36 in the parent material 38, the keys 40 may be driven into the threads 84 within the hole in the parent material. The process of driving the keys 40 into the threads 84 within the hole 36 in the parent material 38 causes the locking portion 46 of the keys to broach through the threads of the hole in the parent material. The keys 40 may remain in place within the newly broached portion of the threads 84 of the parent material 38, thereby locking the threaded insert 20 in place and preventing the threaded insert from rotating during installation or removal of male threaded fasteners into the female threads 30 (FIG. 2) within the central bore 28 of the bushing portion 22. The keys 40 may be driven into the threads within the hole in the parent material through the application of several light taps from a tool, such as a hammer or a mallet, directly onto the end surfaces 66 at the first end 55 of the locking portion 46 of the keys. The keys 40 may be driven until the end surfaces 66 at the first end 55 of the locking portion 46 of the keys are substantially flush, or below flush, with the surface 82 of the parent material 38.

Figure 6:
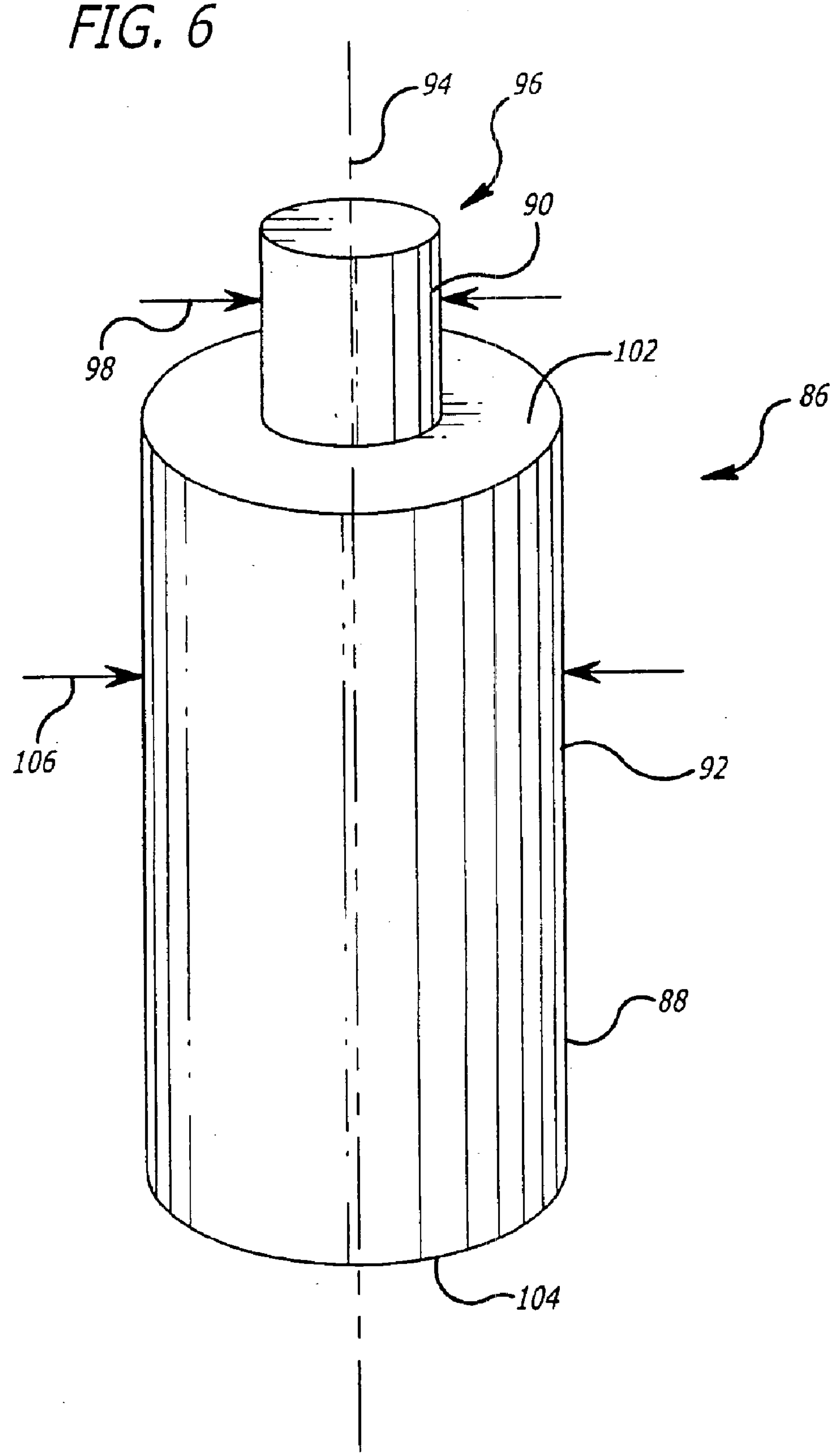
FIG. 6 is a perspective view depicting an installation tool for facilitating the installation of the threaded insert of FIG. 2.

Alternatively, the keys 40 may be driven into the threads within the hole 36 in the parent material 38 through the use of an installation tool 86 (FIG. 6) which may include a substantially longitudinal, cylindrical shaft 88. In one currently preferred embodiment, the installation tool 86 may include at least a first cylindrical portion 90 and a second cylindrical portion 92 which are substantially longitudinally aligned about the longitudinal axis 94 of the cylindrical shaft 88.

The first cylindrical portion 90 is positioned at a first end 96 of the installation tool 86. The first cylindrical portion 90 may include a first diameter 98 which is slightly smaller than the inside diameter 100 of the female threads 30 within the central bore 28 of the bushing portion 22 of the threaded insert 20 (FIGS. 4*a* and 4*b*). The first cylindrical portion 90 may also include a first length which is greater than the distance by which the locking portion 46 of the keys 40 in the threaded insert 20 extend from the first end 24 of the bushing portion 22 of the threaded insert (FIGS. 4*a* and 4*b*).

The second cylindrical portion 92 may include a first face 102 which may be positioned adjacent to the first cylindrical portion 90 and a second face 104 on the opposite end of the second cylindrical portion. The second cylindrical portion 92 may include a second diameter 106 which is larger than the first diameter 98 of the first cylindrical portion 90 such that the first face 102 is sufficiently large to contact the end surfaces 66 at the first end 55 of the locking portion 46 of each of the keys 40 (FIG. 2) within the threaded insert 20 simultaneously.

To drive the keys 40 through the use of the installation tool 86, the first cylindrical portion 90 may be inserted into the central bore 20 (FIGS. 4*a* and 4*b*) from the first end 24 of the bushing portion 22 of the threaded insert 20 until the first face 102 on the second cylindrical portion 92 contacts the end surfaces 66 at the first end 55 of the locking portion 46 of the keys 40. The keys 40 may then be driven through the application of several light taps on the second face 104 of the second cylindrical portion 92 of the installation tool.

As a result of the configurations of the slots 42 and the tang portion 44 of the keys 40, and the method of assembling the keys with the bushing portion 22, the tendency of the keys to broach into the walls 70 of the slots is reduced compared to threaded inserts of prior art configurations. Further, the tendency of the keys 40 to broach into the walls 70 of the slots 42 through the driving of the keys during installation of the threaded insert 20 into the threaded hole 36 in the parent material 38 is reduced compared to threaded inserts of prior art configurations. Therefore, the keys 40 are more easily driven into the parent material 38 during installation of the threaded insert 20 of the present invention than are the keys in threaded inserts of prior art configurations.

From the foregoing, it will be apparent to those skilled in the art of fastener designs that while particular forms of the invention have been illustrated and described, various modifications can be made without departing from the spirit and scope of the invention. Accordingly, it is not intended that the invention be limited, except as by the appended claims.

What is claimed:

1. In a threaded insert having a bushing portion and at least one key, the bushing portion having a substantially cylindrical shape with a first end, a second end and a threaded central bore therethrough, an external surface of the bushing portion including male threads throughout the length of the bushing portion, and at least one slot extending substantially longitudinally throughout the length of the bushing portion positioned on the external surface of the bushing portion, the slot having a bottom surface and two wall surfaces, the two wall surfaces being substantially parallel to each other and substantially perpendicular to the bottom surface, the depth of the slot being greater than the depth of the male threads on the external surface; the at least one key having a substantially longitudinal locking portion connected to a substantially longitudinal tang portion, the substantially longitudinal tang portion including a first end, a second end, a first face, a second face, a first side surface and a second side surface, the substantially longitudinal locking portion including a first end, a second end and a substantially triangular cross section, the triangular cross section forming a back face and two angled faces; the tang portion of the at least one key being positioned within the at least one slot toward the first end of the bushing portion with the locking portion of the at least one key extending beyond the first end of the bushing portion; and the depth of the at least one slot of the bushing portion being sufficient that the apex of the second surface of the tang portion of the at least one key is positioned at a depth deeper than the inside diameter of the male threads on the external surface of the bushing portion and the intersection of the two angled faces of the locking portion of the at least one key is positioned at a depth shallower than the inside diameter of the male threads on the external surface of the bushing portion; and the edge between the first face and the first side surface of the tang portion and the edge between the first face and the second side surface of the tang portion being positioned in contact with the bottom surface of the slot in the bushing portion, the improvement in the threaded insert comprising:

the first face and the second face of the substantially longitudinal tang portion being substantially parallel and having a curved profile.

2. The threaded insert of claim 1, wherein the male threads on the external surface of the bushing portion are configured to mate with a threaded hole in a parent material.

3. The threaded insert of claim 1, wherein the female threads within the central bore of the bushing portion are configured to mate with a male threaded fastener.

4. The threaded insert of claim 1, wherein the at least one key comprises four keys, the four keys being positioned approximately ninety degrees apart from each other about the circumference of the bushing portion.

5. The threaded insert of claim 1, wherein:

the first side surface of the tang portion of the at least one key is substantially perpendicular to a tangent along the first face of the tang portion at the intersection of the first side surface and the first face; and the second side surface of the tang portion of the at least one key is substantially perpendicular to a tangent along the first face of the tang portion at the intersection of the second side surface and the first face.

6. The threaded insert of claim 1, wherein the angled faces of the locking portion of the at least one key taper into the second face of the tang portion of the at least one key.

7. The threaded insert of claim 6, wherein the taper includes an angled taper.

8. The threaded insert of claim 6, wherein the taper includes a curved taper.

9. The threaded insert of claim 1, wherein the intersection of the angled faces of the locking portion of the at least one key is positioned substantially flush with the outside diameter of the male threads on the external surface of the bushing portion.

10. The threaded insert of claim 1, wherein the intersection of the angled faces of the locking portion of the at least one key is positioned below flush with the outside diameter of the male threads on the external surface of the bushing portion.

11. The threaded insert of claim 1, wherein the intersection of the angled faces of the locking portion of the at least one key is positioned above flush with the outside diameter of the male threads on the external surface of the bushing portion.

12. The threaded insert of claim 1, further comprising an end surface at the first end of the locking portion of the at least one key, the end surface being substantially perpendicular to the back face and the two angled faces of the locking portion.

13. The threaded insert of claim 1, wherein the entire locking portion of the at least one key extends beyond the first end of the bushing portion.

14. The threaded insert of claim 1, wherein the first side surface and the second side surface of the tang portion of the at least one key have an interference fit with the two walls within the at least one slot of the bushing portion.

15. The threaded insert of claim 1, wherein the first face has a concave surface, and the second face has a convex surface.

* * * * *

UNITED STATES PATENT AND TRADEMARK OFFICE

CERTIFICATE OF CORRECTION

PATENT NO. : 6,969,221 B2
APPLICATION NO. : 10/716569
DATED : November 29, 2005
INVENTOR(S) : Dennis Schultz It is certified that error appears in the above-identified patent and that said Letters Patent is hereby corrected as shown below:

Column 1,
Line 42, after "the external" insert --surface of the threaded insert. The depth of the dovetail slot is typically greater than the depth of the male threads on the external surface of the threaded insert.--.

Signed and Sealed this

Fifth day of September, 2006

JON W. DUDAS
*Director of the United States Patent and Trademark Office*